C. L. BEAN.
THRESHING MACHINE.
APPLICATION FILED JUNE 11, 1909.

971,239.

Patented Sept. 27, 1910.
2 SHEETS—SHEET 1.

WITNESSES:

INVENTOR.
Charles L. Bean,
By Owen & Owen,
His attys.

C. L. BEAN.
THRESHING MACHINE.
APPLICATION FILED JUNE 11, 1909.

971,239.

Patented Sept. 27, 1910.
2 SHEETS—SHEET 2.

WITNESSES:

INVENTOR.
Charles L. Bean,
By Owen & Owen,
His attys.

UNITED STATES PATENT OFFICE.

CHARLES L. BEAN, OF TOLEDO, OHIO, ASSIGNOR OF ONE-HALF TO FRED C. KLINE, OF TOLEDO, OHIO.

THRESHING-MACHINE.

971,239.   Specification of Letters Patent.   Patented Sept. 27, 1910.

Application filed June 11, 1909.   Serial No. 501,562.

*To all whom it may concern:*

Be it known that I, CHARLES L. BEAN, a citizen of the United States, and a resident of Toledo, in the county of Lucas and State of Ohio, have invented a certain new and useful Threshing-Machine; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to combined threshers and separators for grain such as wheat, oats or the like; and has for its object the provision of simple, improved and highly efficient apparatus of this class which effectually cleans and separates the grain from the chaff and straw, and which reduces the grain loss due to insufficient threshing to a minimum, thus enhancing the practicability and commercial value of apparatus of this class.

The operation, construction and arrangement of the parts of the invention are fully described in the following specification, and while the invention in its broader aspect is susceptible of numerous modifications, a preferred embodiment thereof is illustrated in the accompanying drawings, in which,—

Figure 1:
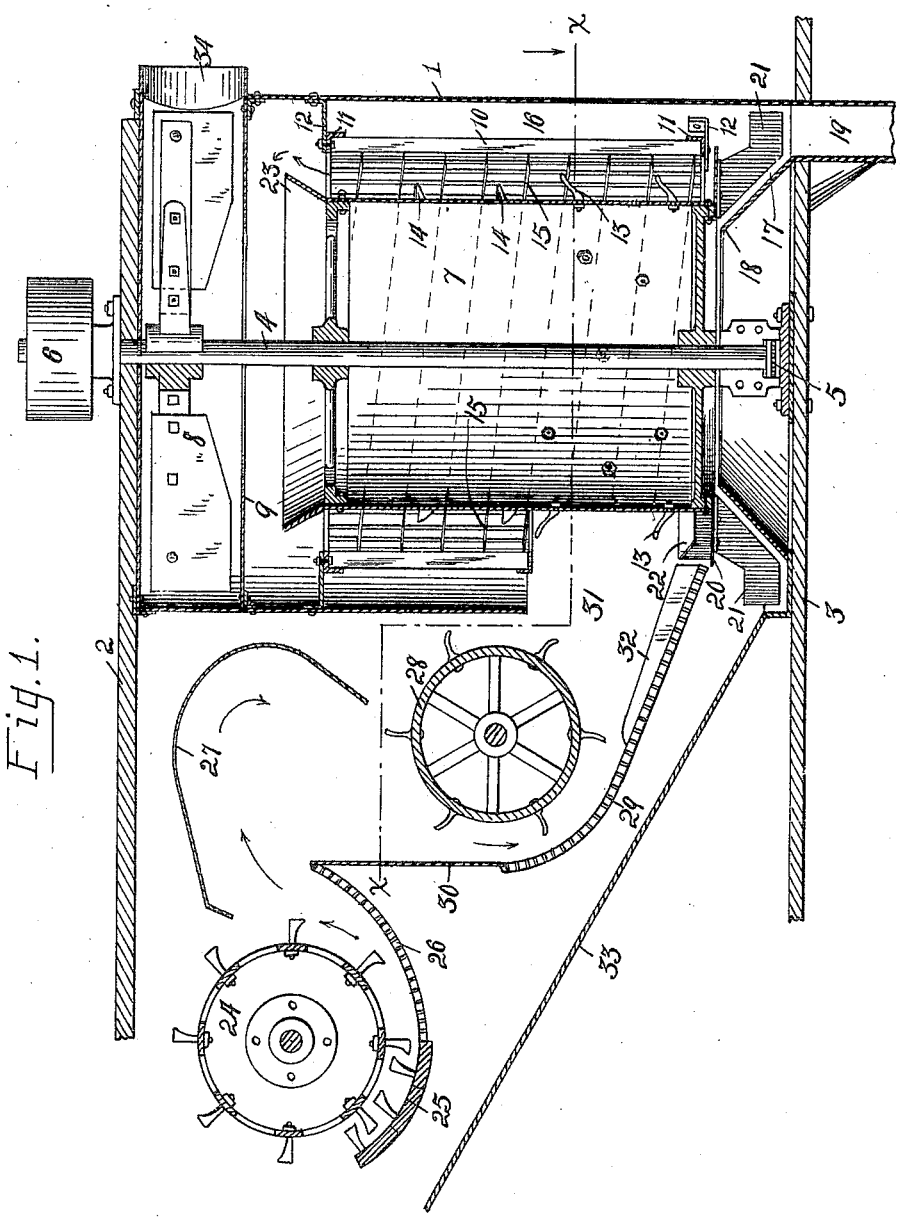
Figure 2:
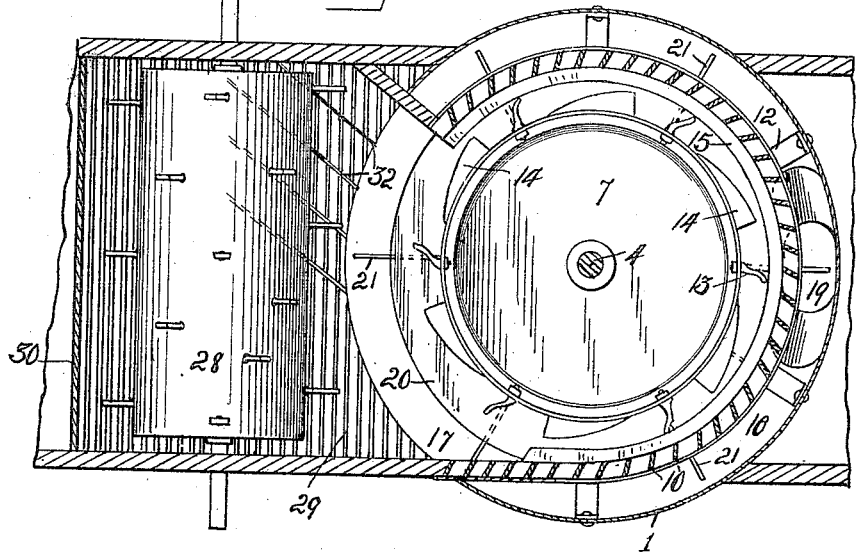
Figure 3:
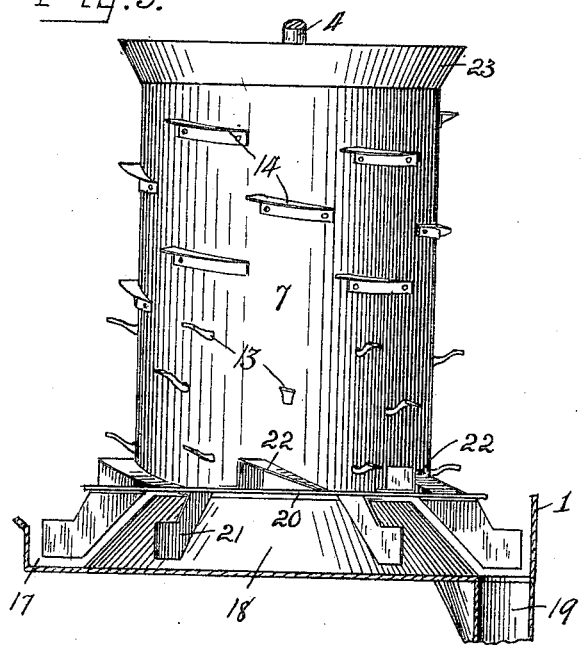

Figure 1 is a central longitudinal vertical section of the mechanism embodying my invention. Fig. 2 is a horizontal section on the line x x in Fig. 1, and Fig. 3 is a side elevation of the vertical threshing cylinder and subjacent grain trough.

Referring to the drawings, 1 designates a vertically disposed casing preferably of cylindrical form, which is disposed between the upper and lower frame parts 2 and 3, respectively, and 4 a vertical shaft which is disposed centrally within such casing and has its lower end journaled in an end-thrust bearing 5 carried by the frame part 3, and its upper end projected beyond its bearing in the upper frame part 2 and carrying a pulley 6 for a drive belt. The shaft 4 carries a drum or cylinder 7 within the lower portion of the casing 1 and a fan 8 within the upper portion of such cylinder, as shown, the drum and fan being separated by an annular flange 9 which is secured to the interior of the casing, and provides a restricted opening between the compartments in which the drum and fan are respectively disposed.

Arranged within the casing 1 around the drum 7 and in spaced relation to each is a separating cylinder, which is open at top and bottom and preferably comprises a plurality of laterally-spaced vertically-disposed bars 10, but may be of other construction if desired. The bars 10 are rigidly secured at their ends to rings or strips 11 which are held rigidly spaced from the casing by braces or brackets 12.

The drum 7 has the lower portion of its circumference provided with spikes 13 while the portion thereof above such spikes is provided with a plurality of spirally arranged fins or blades 14, which are preferably broadened from their forward ends rearwardly, as shown. The spikes 13 and blades 14 coöperate with the bars 10 and the spiral flange 15 carried internally thereby to effect a thorough threshing or separating of the grain from the straw and chaff passing around the space between the drum and such bars. The fins 14 and flange 15 are spirally arranged to effect a gradual elevation of the straw within the annular space between the drum and separator-bars 10 as it is driven around such space by a rotation of the drum. The forced draft created through the interior of the casing 1 by the operation of the fan 8 also tends to draw the straw and chaff upwardly through the casing and into the fan chamber while the grain is driven outwardly through the spaces between the bars 10 by centrifugal force and then drops through the annular space 16 surrounding such bars into the annular delivery-trough 17 at the bottom thereof. The inner wall of such trough is formed by the annular flange 18, which rises from the bottom thereof and is preferably inclined inwardly as shown. An outlet 19 for the grain is provided at one side of the trough 17.

Secured to and projecting radially from the lower end of the drum 7 is an annular flange 20 which has its outer edge preferably terminating under the lower ends of the separator bars 10 in spaced relation thereto. This flange prevents the straw and chaff from entering the trough 17 but permits the grain falling thereon to be thrown outwardly into the trough through the space provided between the outer edge of such flange and the lower ends of the bars 10. Attached to the underside of the flange 20 and projecting downwardly into the trough 17 are a plurality of wings 21, which revolve with the drum and serve to move grain in the trough to the outlet 19.

22 designates a plurality of inclined flanges which are arranged at intervals around the top of the flange 20 and are inclined from their forward ends rearwardly, with reference to the direction of rotation of the drum, so as to tend to lift straw and chaff falling on the flange into position to be caught by the air currents created by the fan 8 and to be acted on by the spikes 13.

The drum 7 is preferably formed at its upper end with an upwardly and outwardly inclined deflector flange 23, which causes an outward deflection of the straw and chaff as they pass around the upper edge of the drum to enter the fan chamber. The deflection of the straw, etc., in this manner tends to throw whatever grain may be left unseparated outwardly over the tops of the bars 10 and into the space 16 through which it drops to the trough 17.

24 designates the usual spiked threshing cylinder, which is disposed in rear of the casing 1 with its axis in a plane near the top of such casing and operates over the usual spiked concaves 25 and grate bars 26, which latter are curved so as to direct the grain and straw upwardly to be obstructed and directed downwardly and rearwardly by the curved deflector plate 27, as indicated by the arrows. Disposed intermediate the cylinder 24 and casing 1 below the plane of the former is a second spiked cylinder 28, which operates over a set of grate bars 29 extending transversely of the machine or longitudinally of the cylinder 28. The set of grate-bars 29 has its rear end curved partially around the cylinder 28 and connected to the forward end of the set of bars 26 by a vertical plate or partition 30, and has its forward end inclined downwardly from beneath the cylinder 28 and projected through an opening 31 in the lower portion of the contiguous side of the casing 1 and terminates adjacent the outer edge of the flange 20 so as to direct the grain and straw thereon through an opening which is provided in the cylinder formed by the separator-bars 10 in register with the opening 31. Secured to the tops of the bars 29 are a plurality of strips 32 which are disposed diagonally thereof, as shown in Fig. 2 to cause the matter to pass over the gratebars substantially tangential to the drum 7 in the direction of rotation thereof. The placing of the cylinder 28 below the plane of the cylinder 24 is found to be quite an important feature in the practical and efficient working of the mechanism. The grain which falls through the grate-bars 26 and 29 drops upon the inclined bottom-plate or floor 33 and is directed thereby into the trough 17.

In the operation of my invention, the grain is fed between the cylinder 24 and concaves 25 in the usual manner, thence upwardly over the grate-bars 26 and is deflected downwardly between the cylinder 28 and grate-bars 29 by the deflector 27. The grain in passing over the grate-bars 29 is directed by the strips 32 to pass through the opening 31 in the casing in a direction which is substantially tangential to the drum 7 to adapt it to enter the space between the drum 7 and the separator bars 10 in the direction of rotation of the drum. The spikes 13, fins 14, and spiral flange 15 coöperate with the bars 10 to effect a thorough separation of the grain from the straw and chaff and coöperate with the draft created by the fan 8 to effect an elevation of the straw and chaff to the top of the drum, whence it is drawn by the air draft into the fan chamber and is then forced out through the delivery opening 34 to the stacker. As the grain is separated from the straw, etc., it is thrown outwardly through the spaces between the bars 10 and permitted to drop by gravity through the space 16 to the trough 17 where it is moved by the revolving wings 21 attached to the drum and delivered to the outlet 19.

With this apparatus it is found that the grain is not only entirely separated from the straw but is also thoroughly winnowed and cleaned.

Having thus described my invention, what I claim as new and desire to secure by Letters Patent, is,—

1. In an apparatus of the class described, the combination of a rotary drum having a vertical axis, and its circumference provided with protuberant portions, a plurality of laterally spaced vertically disposed bars arranged around the drum and adapted to coöperate therewith to separate grain and straw fed therebetween, and a flange spirally secured to the inner side of said bars around the drum, substantially as described.

2. In an apparatus of the class described, the combination of a rotary drum having a vertical axis, a plurality of spikes carried by the lower circumferential portion of said drum, a plurality of spirally arranged fins carried by the upper circumferential portion of said drum, and a plurality of laterally-spaced vertically-disposed bars arranged around said drum and adapted to coöperate therewith to separate grain and straw fed therebetween.

3. In an apparatus of the class described, the combination of a rotary drum having a vertical axis, said drum having its circumference provided with a plurality of spikes and spirally arranged fins, which fins broaden from their forward ends rearwardly, and means arranged around the drum and adapted to coöperate with said spikes and fins to separate grain from straw fed therebetween and having spaces for the escape of grain.

4. In an apparatus of the class described, the combination of a rotary drum having a vertical axis, a plurality of spikes and spirally arranged fins carried circumferentially by said drum, a separator screen arranged around the drum to coöperate with said spikes and fins to separate grain from straw fed between such drum and screen, and a spiral flange secured to the inner side of the screen and adapted to coöperate with said spikes and fins to effect an elevation of said straw.

5. In an apparatus of the class described, the combination of a casing having an annular trough therein provided with an outlet, a drum disposed within said casing and having a vertical axis, and means arranged around the drum within the casing for coöperating therewith to separate grain and straw fed therebetween and adapted to permit separated grain to pass therethrough whereby it may drop without such means into said trough.

6. In an apparatus of the class described, the combination of a casing, a fan disposed in the upper part thereof for creating a forced draft therethrough, a separator drum disposed within the lower portion of said casing and having a vertical axis, laterally spaced vertically disposed separator bars arranged around the drum to coöperate therewith to separate grain from straw fed therebetween, means associated with said bars and drum for coöperating with the forced draft for effecting an elevation of the grain and straw fed between said separator parts, and a trough disposed at the bottom of the casing for receiving the separated grain.

7. In an apparatus of the class described, the combination of a casing, a rotary separator drum disposed therein and having a vertical axis, separator means arranged around the drum and adapted to coöperate therewith to separate matter fed therebetween, a trough disposed at the bottom of the drum in position to catch a portion of the separated matter, said trough having an outlet at one side thereof, and means carried by the drum and projecting within the trough for effecting a movement of the matter within the trough to the outlet.

8. In an apparatus of the class described, the combination of a casing, a rotary separator drum disposed therein and having a vertical axis, stationary separator means arranged around said drum within the casing and adapted to coöperate with the drum to separate matter fed therebetween, a flange projected radially from the lower portion of the drum, a trough disposed in the lower portion of the casing said trough having an outlet at one side thereof and means attached to said flange and projecting within the trough for effecting a movement of the matter therein when the drum is rotated.

9. In an apparatus of the class described, the combination of a casing having two superimposed communicating chambers, a shaft projecting vertically through said chambers, a fan carried by said shaft within the upper chamber for creating a forced draft through the casing, a separator drum carried by the shaft within the lower chamber, stationary separator means arranged around the drum and adapted to coöperate therewith to effect a separation of matter fed therebetween, spirally arranged means annularly carried by the drum, spirally arranged means carried by said stationary separator means, said two spirally arranged means being adapted to coöperate with the air draft to effect an elevation of the matter when the drum is rotated, a delivery trough disposed within the casing at the bottom of the drum, and means movable with the drum for effecting a movement of the matter within the trough.

10. In an apparatus of the class described, a casing pneumatic stacker means associated therewith, a separator drum disposed within said casing and having a vertical axis, said drum having an annular deflector flange at its upper end, stationary separator means arranged around the drum and adapted to coöperate therewith to separate matter fed between them, and means carried by the drum and said separator means for coöperating with the pneumatic stacker means to effect an elevation of a portion of such matter.

11. In an apparatus of the class described, a casing, a rotary separator drum disposed within said casing and having a vertical axis, stationary separator means arranged around the drum and adapted to coöperate therewith to effect a separation of matter fed therebetween, an annular flange projecting horizontally from the lower edge of the drum, and a plurality of inclined members associated with said flange and adapted to effect an elevation of matter fed between the drum and said separator means.

In testimony whereof I have hereunto signed my name to this specification in the presence of two subscribing witnesses.

CHARLES L. BEAN.

Witnesses:
C. W. OWEN,
CORNELL SCHREIBER.